(12) United States Patent
Stellanova (10) Patent No.: US 9,117,003 B2
(45) Date of Patent: Aug. 25, 2015

(54) SYSTEM, METHOD AND COMPUTER PROGRAM PRODUCT FOR NAVIGATING CONTENT ON A SINGLE PAGE

(75) Inventor: Todd Stellanova, Papaikou, HI (US)

(73) Assignee: salesforce.com, inc., San Francisco, CA (US)

( * ) Notice: Subject to any disclaimer, the term of this patent is extended or adjusted under 35 U.S.C. 154(b) by 1018 days.

(21) Appl. No.: 12/978,354

(22) Filed: Dec. 23, 2010

(65) Prior Publication Data

US 2011/0225486 A1    Sep. 15, 2011

Related U.S. Application Data

(60) Provisional application No. 61/313,617, filed on Mar. 12, 2010.

(51) Int. Cl.
*G06F 17/00* (2006.01)
*G06F 17/30* (2006.01)
*G06F 17/22* (2006.01)

(52) U.S. Cl.
CPC ...... *G06F 17/30905* (2013.01); *G06F 17/2247* (2013.01); *G06F 17/3089* (2013.01)

(58) Field of Classification Search
CPC .......... G06F 17/30905; G06F 17/2247; G06F 17/3089; G06F 17/211; G06F 17/24
USPC ........................ 715/234, 255, 205–206, 241
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |

(Continued)

OTHER PUBLICATIONS

U.S. Appl. No. 60/828,192, filed Oct. 4, 2006.

*Primary Examiner* — Thu Huynh (74) *Attorney, Agent, or Firm* — Zilka-Kotab, PC (57) ABSTRACT

In accordance with embodiments, there are provided mechanisms and methods for navigating content on a single page. These mechanisms and methods for navigating content on a single page can enable optimized navigation of displayed content, more efficient content processing and resource use, increased content display speed, etc.

15 Claims, 4 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,209,929 B2 | 4/2007 | Dominguez, Jr. et al. |
| 7,225,407 B2 * | 5/2007 | Sommerer et al. ............ 715/738 |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0010715 A1 * | 1/2002 | Chinn et al. ................. 707/514 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0091732 A1 * | 7/2002 | Pedro ............................ 707/505 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 * | 4/2003 | Laane ........................... 715/513 |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0003351 A1 * | 1/2004 | Sommerer et al. ............ 715/517 |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268429 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0132018 A1 * | 6/2005 | Milic-Frayling et al. ..... 709/213 |
| 2005/0223022 A1 | 10/2005 | Weissman et al. |
| 2005/0283478 A1 | 12/2005 | Choi et al. |
| 2006/0206834 A1 | 9/2006 | Fisher et al. |
| 2008/0022229 A1 * | 1/2008 | Bhumkar et al. ............. 715/838 |
| 2008/0249972 A1 | 10/2008 | Dillon |
| 2009/0063415 A1 | 3/2009 | Chatfield et al. |
| 2009/0100021 A1 * | 4/2009 | Morris et al. ..................... 707/3 |
| 2009/0222454 A1 * | 9/2009 | Liesche et al. ................. 707/10 |
| 2010/0235733 A1 * | 9/2010 | Drislane et al. ............... 715/702 |

* cited by examiner

SYSTEM, METHOD AND COMPUTER PROGRAM PRODUCT FOR NAVIGATING CONTENT ON A SINGLE PAGE

CLAIM OF PRIORITY

This application claims the benefit of U.S. Provisional Patent Application 61/313,617, entitled "Method and system for implementing a mobile client," by Todd Stellanova, filed Mar. 12, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to displaying content, and more particularly to navigating displayed content.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Displaying content to users is a common practice of conventional systems. For example, a system may provide for the display of content on mobile devices of one or more users (e.g., utilizing a single page display technique). Unfortunately, techniques for displaying content and allowing navigation of such content have been associated with various limitations.

Just by way of example, traditional methods of navigating content displayed as a single page may be impractical. For example, a system may pre-render an entire volume of content into the single page display, which may prove to be time and resource intensive. In another example, the system may add a plurality of content placeholders to the single page display and render them later, which may also be costly in terms of time and resources. Accordingly, it is desirable to provide techniques that improve the navigation and display of content on a single page display.

BRIEF SUMMARY

In accordance with embodiments, there are provided mechanisms and methods for navigating content on a single page. These mechanisms and methods for navigating content on a single page can enable optimized navigation of displayed content, more efficient content processing and resource use, increased content display speed, etc.

In an embodiment and by way of example, a method for navigating content on a single page is provided. In one embodiment, a first request is received from a user for content to be displayed on a single page. Additionally, the content is retrieved. Further, the content is added to a data structure associated with the single page. Further still, the content from the data structure is displayed on the single page.

While one or more implementations and techniques are described with reference to an embodiment in which navigating content on a single page is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for navigating content on a single page.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for navigating content on a single page will be described with reference to example embodiments.

Figure 1:
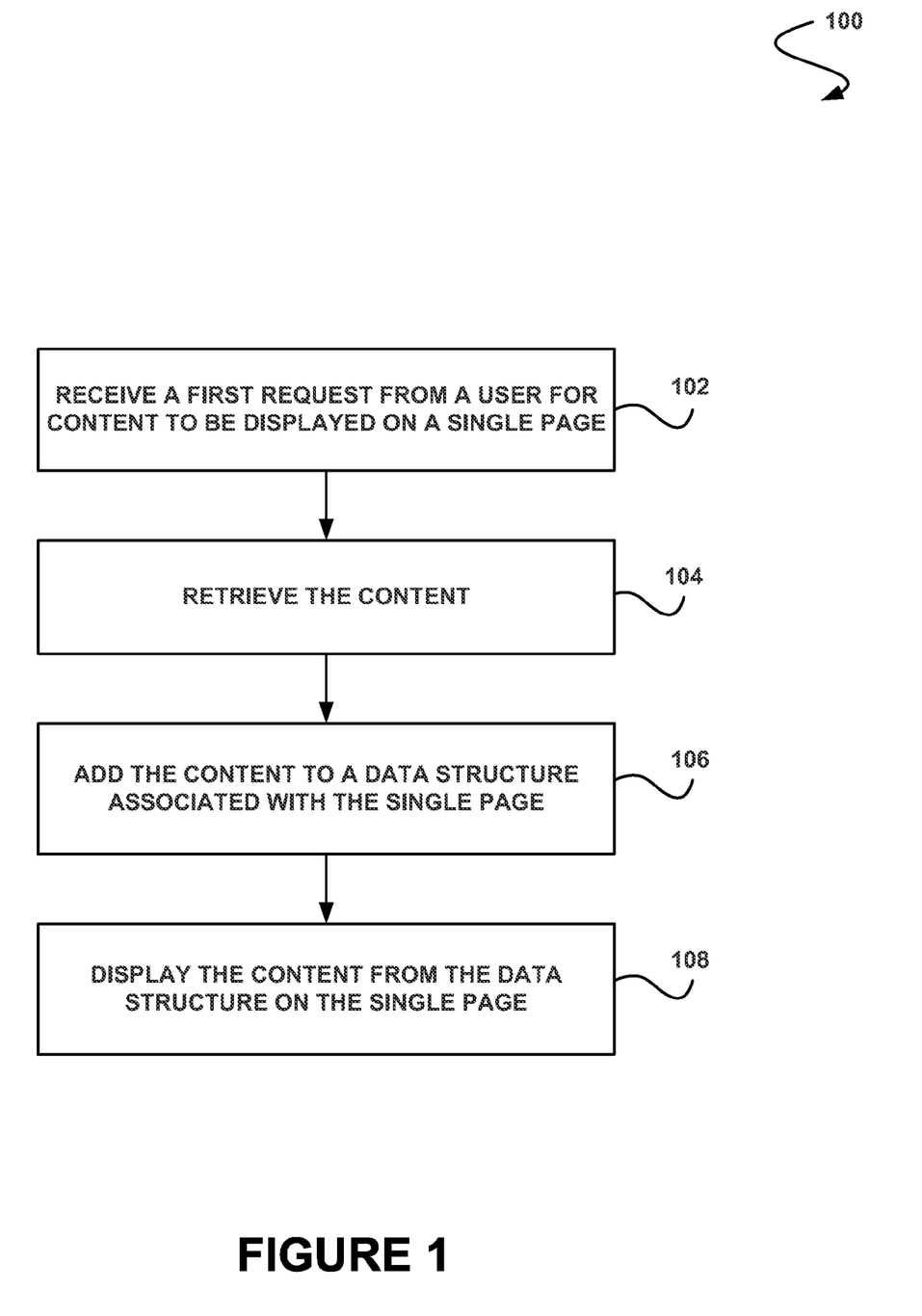
FIG. 1 illustrates a method for navigating content on a single page, in accordance with one embodiment.

FIG. 1 illustrates a method 100 for navigating content on a single page, in accordance with one embodiment. As shown in operation 102, a first request is received from a user for content to be displayed on a single page. In one embodiment, the single page may include any page capable of displaying requested content to the user (e.g., a single HTML page, etc.). In another embodiment, the single page may be displayed on a device. For example, the single page may be displayed on a portable device, such as a cell phone, a smart phone, a personal digital assistant (PDA), etc. Additionally, in yet another embodiment, the single page may be displayed using a browser of the device (e.g., an Internet browser, a mobile web browser, a web browser with caching and scripting support, etc.).

Further, in one embodiment, the content may include any data that is displayed to the user. For example, the content may include one or more records, the content of one or more organizations, etc. In another embodiment, the content may include content from a system (e.g., a client, a server, a multi-tenant on-demand database system, etc.). Also, in another embodiment, the request may include a selection of a link (e.g., a hyperlink, etc.) by the user from within the single page. In yet another embodiment, the request may include the entry of a location of the data into a field by the user (e.g., utilizing a uniform resource locator (URL), etc.). Of course, however, the request may be received from the user in any manner.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Furthermore, as shown in operation 104, the content is retrieved. In one embodiment, the content may be retrieved from a system. In another embodiment, the content may be retrieved from a data store (e.g., a database, etc.) associated with the system. Further still, in one embodiment, the content may be retrieved utilizing an application (e.g., an application written utilizing Asynchronous JavaScript and XML (AJAX), etc.). In another embodiment, the content may retrieved in a first format and translated into a second format.

Also, as shown in operation 106, the content is added to a data structure associated with the single page. In one embodiment, content that is displayed on the single page may be stored in the data structure. For example, the data structure may be stored within an HTML page, where the HTML page includes display information for the single page. In another embodiment, the data structure may include a stack (e.g., a navigation stack, etc.). In yet another embodiment, the content may be added to the data structure utilizing a script language (e.g., JavaScript, etc.).

Additionally, in one embodiment, adding the content to the data structure may include creating a new section of the data structure. For example, a new section of the data structure may be cloned from a template (e.g., a template within the HTML page, etc.). Further, in another embodiment, the content may be added to the data structure. For example, the cloned data structure section template may be populated with the content, may be formatted, etc.

Further still, in yet another embodiment, adding the content to the data structure may include adding the content to the top of the data structure (e.g., by pushing the new section of the data structure with the content on to the data structure, etc.). For, example, the data structure may include a navigation stack which may include a marker that indicates the top of the stack. Additionally, a new section of the stack containing the content may be pushed onto the stack by adding the new section immediately after the marker. Also, as shown in operation 108, the content from the data structure is displayed on the single page. In one embodiment, the data structure that contains the content may be rendered by a browser. In another embodiment, additional content stored within the data structure may be displayed in addition to the content added in response to the first request.

Further, in one embodiment, prior to receiving the first request for the content, previous content may be displayed to the user from the data structure on the single page. Additionally, in another embodiment, after the content from the data structure is displayed on the single page in response to the first request from the user, a second request may be received from the user for the previous content to be displayed on the single page. For example, the second request may include the selection of a "back" icon on an internet browser, etc.

Further, in yet another embodiment, in response to the second request, the content added to the data structure in response to the first request may be removed (e.g., "popped," etc.) from the data structure. For example, a marker may note where the content was added to the data structure in response to the first request, and such content may be removed utilizing the marker. In still another embodiment, the previous content from the data structure may be displayed on the single page. In this way, additional sections of the data structure may be dynamically added for displaying on the single page, and may be dynamically removed when a user requests viewing of earlier sections of the data structure. Further, the user may view a smooth transition between sections of information displayed from the data structure.

Figure 2:
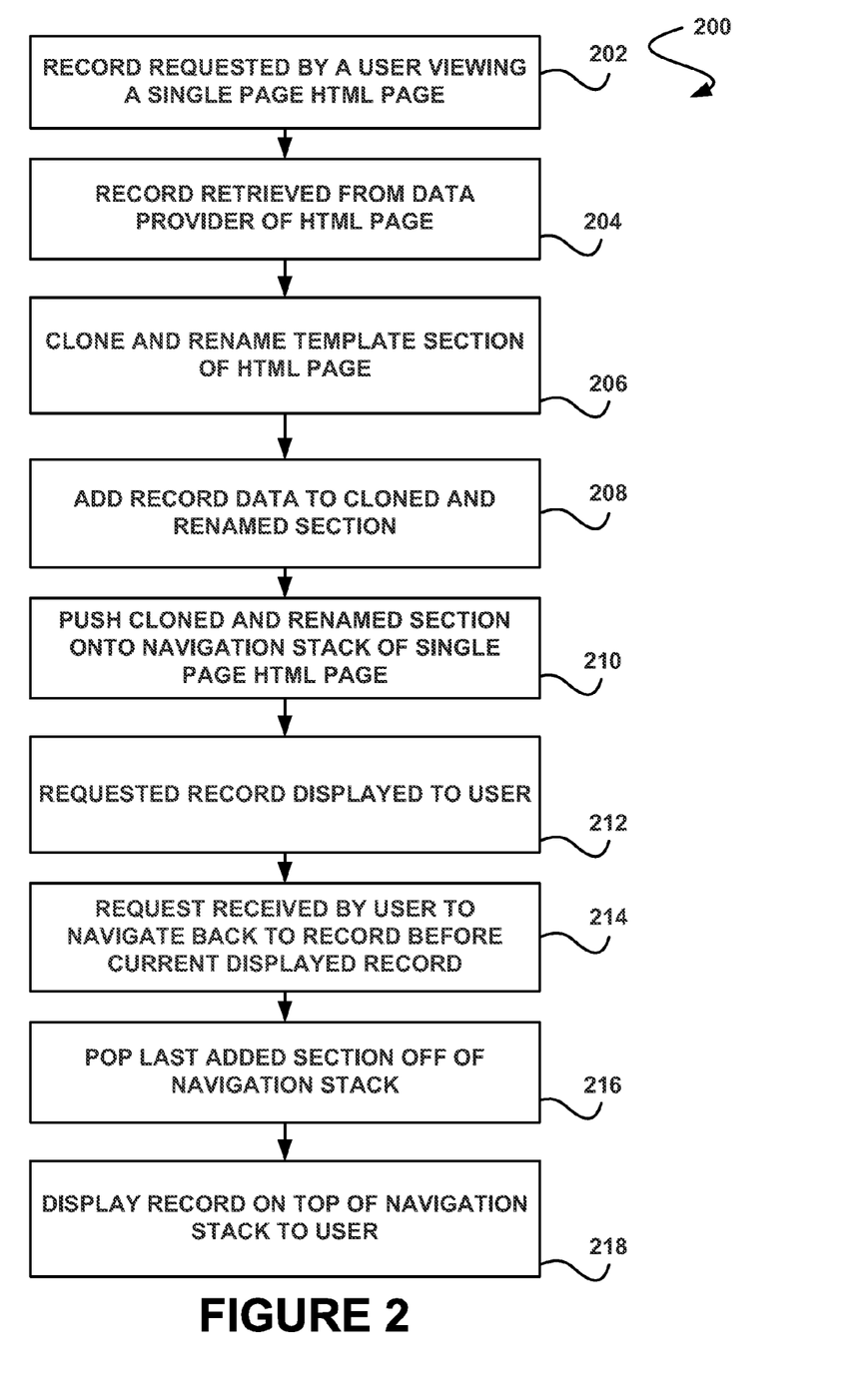
FIG. 2 illustrates a method for adding and removing a record in single page HTML navigation, in accordance with another embodiment.

FIG. 2 illustrates a method 200 for adding and removing a record in single page HTML navigation, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a record is requested by a user viewing a single page HTML page. For example, the user may be viewing a human resources "org chart" application that may allow the user to navigate up an organization chart tree (e.g., of a system, etc.) from employee to manager, manager's manager, etc. Additionally, the user may currently be viewing an employee record and may select a link on the single page in order to navigate from an employee record to a related employee record. For example, the user may utilize iUI and/or jqTouch libraries in order to view the single page HTML page.

Further, as show in operation 204, the requested record is retrieved from a data provider of the HTML page. For example, a database providing data for the human resources "org chart" application may be queried, and may return the requested record to the application. In one embodiment, the requested record may be translated from a format in which it was stored in the database into a format usable by the HTML page.

Further still, as shown in operation 206, a template section of the HTML page is cloned, and the cloned section is renamed for the requested record. For example, each node in the organization chart tree may include an anchor section (e.g., a div, etc.) displayed on the mobile HTML web page, where each section may have a nearly identical format and only slightly different data. Additionally, the HTML page may include a shallow template section, which may be cloned and renamed for the requested record.

Also, as shown in operation 208, data from the requested record is added to the cloned and renamed section. In addition, as shown in operation 210, the cloned and renamed section is pushed onto a navigation stack of the single page HTML page. In another embodiment, additional data may be added to the cloned and renamed section before it is pushed onto the navigation stack. For example, the pre-rendered HTML page contains a "marker" section that indicates a start of the navigation stack. Additionally, the cloned and renamed section may be given an identifier that reflects the record type and time of creation of the section. Further, the cloned and renamed section may be pushed onto the navigation stack, which may consist of inserting it into the HTML document object model (DOM) right after the marker section.

Table 1 illustrates an exemplary HTML DOM page showing an empty navigation stack. Of course, it should be noted that the HTML DOM page shown in Table 1 is set forth for illustrative purposes only, and thus should not be construed as limiting in any manner.

TABLE 1

```
//Stage 0: the template div, objectDetailPage, and the marker div with id
"lastPage" are both provided in the initial HTML page
...
    <div id="objectDetailPage" >
        <div class="toolbar">
            <a class="back" href="#">back</a>
            <h1> </h1>
        </div>
        <div class="headerMsg" >
        </div>
        <div id="objectDetailView" class="panel">
        </div>
    </div>
...
    <div id="lastPage" >
        Last page.
    </div>
...
```

Table 2 illustrates an exemplary HTML DOM page showing the navigation stack after a record is selected. Of course, it should be noted that the HTML DOM page shown in Table 2 is set forth for illustrative purposes only, and thus should not be construed as limiting in any manner.

TABLE 2

```
// Stage 1: User selects record Bob Dobbs. The template objectDetailPage
is cloned, modified with the relevant record info for Bob Dobbs, and
inserted into the DOM after lastPage.
...
    <div id="objectDetailPage" >
        <div class="toolbar">
            <a class="back" href="#">back</a>
            <h1> </h1>
        </div>
        <div class="headerMsg" >
        </div>
        <div id="objectDetailView" class="panel">
        </div>
    </div>
...
    <div id="lastPage" >
        Last page.
    </div>
```

TABLE 2-continued

```
    <div id="objectDetailPage20100308_051500" >
        <div class="toolbar">
            <a class="back" href="#">back</a>
            <h1> </h1>
        </div>
        <div class="headerMsg" >
        Bob Dobbs
        </div>
        <div id="objectDetailView" class="panel">
        29-2298 Hanamalo Loop, Hakalau HI 96710
        <br/><a href="#boss">Boss: Mary Jones</a>
        </div>
    </div>
...
```

Table 3 illustrates an exemplary HTML DOM page showing the navigation stack after a second record is selected. Of course, it should be noted that the HTML DOM page shown in Table 3 is set forth for illustrative purposes only, and thus should not be construed as limiting in any manner.

TABLE 3

```
// Stage 2: User selects the boss link for Bob Dobbs, Mary Jones, and and
this record is pushed onto nav stack after the marker
...
    <div id="objectDetailPage" >
        <div class="toolbar">
            <a class="back" href="#">back</a>
            <h1> </h1>
        </div>
        <div class="headerMsg" >
        </div>
        <div id="objectDetailView" class="panel">
        </div>
    </div>
...
    <div id="lastPage" >
        Last page.
    </div>
    <div id="objectDetailPage20100308_051700" >
        <div class="toolbar">
            <a class="back" href="#">back</a>
            <h1> </h1>
        </div>
        <div class="headerMsg" >
        Mary Jones
        </div>
        <div id="objectDetailView" class="panel">
        1878 Turk Street, San Francisco CA 94115
        <br/><a href="#boss">Boss: Calvin Onomea</a>
        </div>
    </div>
    <div id="objectDetailPage20100308_051500" >
    ...
    </div>
...
```

Table 4 illustrates an exemplary HTML DOM page showing the navigation stack after a third record is selected. Of course, it should be noted that the HTML DOM page shown in Table 4 is set forth for illustrative purposes only, and thus should not be construed as limiting in any manner.

TABLE 4

```
// Stage 3: User selects Calvin Onomea and this record is pushed onto
the nav stack
...
    <div id="objectDetailPage" >
        <div class="toolbar">
            <a class="back" href="#">back</a>
            <h1> </h1>
        </div>
        <div class="headerMsg" >
```

TABLE 4-continued

```
        </div>
        <div id="objectDetailView" class="panel">
        </div>
    </div>
...
    <div id="lastPage" >
        Last page.
    </div>
    <div id="objectDetailPage20100308_051900" >
        <div class="toolbar">
            <a class="back" href="#">back</a>
            <h1> </h1>
        </div>
        <div class="headerMsg" >
        Calvin Onomea
        </div>
        <div id="objectDetailView" class="panel">
        514 Old Mamalahoa Hwy, Honomu HI 96728
        <br/><a href="#boss">Boss: Sparky Clemens</a>
        </div>
    </div>
    <div id="objectDetailPage20100308_051700" >
    ...
    </div>
    <div id="objectDetailPage20100308_051500" >
    ...
    </div>
...
```

Further still, as shown in operation 212, the requested record is displayed to the user. Also, as shown in operation 214, a request is received by the user to navigate back to the record displayed before the currently displayed record. For example, the user may select a "back" icon from within the human resources "org chart" application. Additionally, as shown in operation 216, in response to the user selection of the "back" icon, the last section added to the navigation stack is popped off of the navigation stack. In this way, the record displayed to the user before the last requested record may be located on the top of the navigation stack.

Table 5 illustrates an exemplary HTML DOM page showing the navigation stack after a user selects a "back" link after viewing the third record. Of course, it should be noted that the HTML DOM page shown in Table 5 is set forth for illustrative purposes only, and thus should not be construed as limiting in any manner.

TABLE 5

```
//Stage 4: User selects 'Back' link from Calvin Onomea, div id
objectDetailPage20100308_051900 is removed from the nav stack,
leaving Mary Jones (id = objectDetailPage20100308_051700) on the top
of the nav stack
...
    <div id="objectDetailPage" >
        <div class="toolbar">
            <a class="back" href="#">back</a>
            <h1> </h1>
        </div>
        <div class="headerMsg" >
        </div>
        <div id="objectDetailView" class="panel">
        </div>
    </div>
...
    <div id="lastPage" >
        Last page.
    </div>
    <div id="objectDetailPage20100308_051700" >
        <div class="toolbar">
            <a class="back" href="#">back</a>
            <h1> </h1>
        </div>
        <div class="headerMsg" >
```

TABLE 5-continued

```
        Mary Jones
        </div>
        <div id="objectDetailView" class="panel">
        1878 Turk Street, San Francisco CA 94115
        <br/><a href="#boss">Boss: Calvin Onomea</a>
        </div>
    </div>
    <div id="objectDetailPage20100308_051500" >
    ...
    </div>
...
```

Further, as shown in operation 218, the record on top of the navigation stack is displayed to the user. For example, the record displayed to the user before the last requested record may be located on the top of the navigation stack and may therefore be displayed to the user. In this way, a clear navigation stack may exist in the HTML DOM, such that when a user navigates from one record to another record, a new section is pushed onto the navigation stack, and when a user navigates to a previous section on the HTML page, a section may be popped from the navigation stack. This may avoid pre-rendering an entire chart (e.g., an organization chart) into the single cached HTML page, as well as placing multiple empty "dummy" sections into the HTML document and rendering them later. Additionally, additional sections may be dynamically rendered into an existing single HTML page and dynamic navigation back between sections may be supported. Further, by navigating between sections on a single HTML page, the browser may avoid accessing a network to render content.

System Overview

Figure 3:
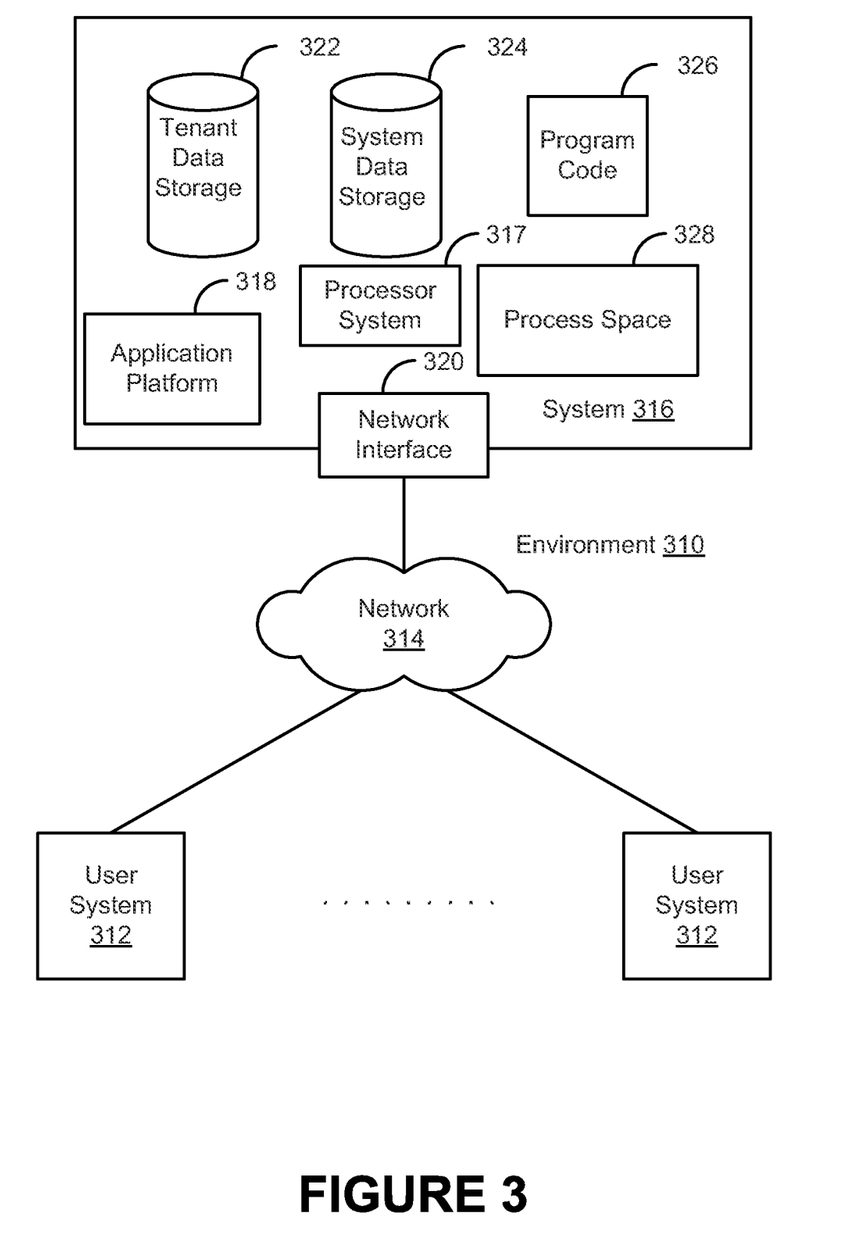
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media)

having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
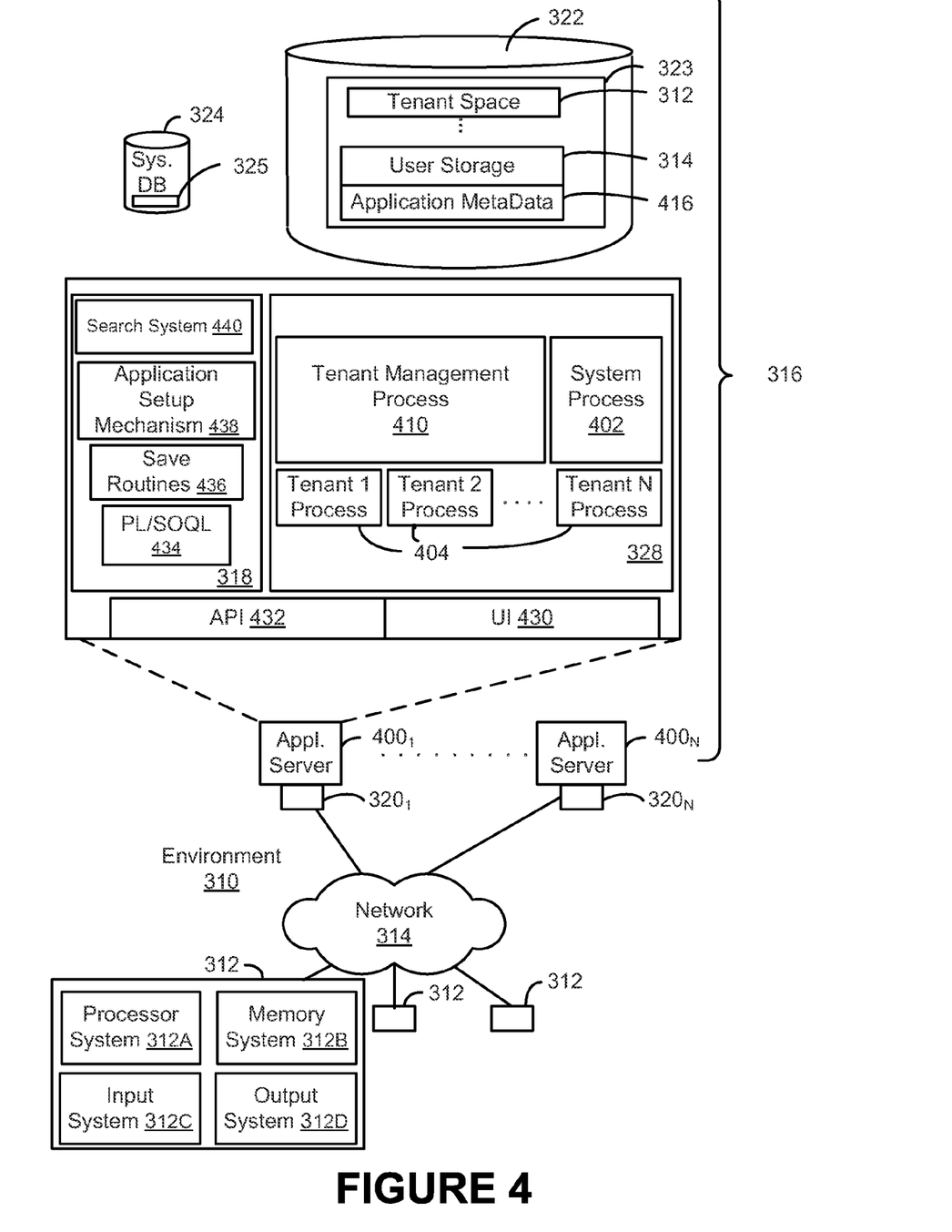
FIG. 4 illustrates a block diagram of an embodiment of elements of FIG. 4 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact. Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code for navigating content on a single page, and when executed by a computer, causing the computer to perform operations comprising:
   receiving a first request from a user for content to be displayed;
   retrieving the content from a database, where the content is stored in a first format;
   translating the retrieved content from the first format to a second format;

cloning a template section of a hypertext markup language (HTML) page and renaming the cloned template section to identify the requested content;

adding the retrieved and translated content to the cloned and renamed template section;

pushing the cloned and renamed template section onto a navigation stack of the HTML page; and displaying the content from the navigation stack of the HTML page.

2. The computer program product of claim 1, wherein the computer program product is operable such that the HTML page is displayed on a portable device.

3. The computer program product of claim 2, wherein the computer program product is operable such that the HTML page is displayed using a browser of the device.

4. The computer program product of claim 1, wherein the content includes content from a multi-tenant on-demand database system.

5. The computer program product of claim 1, wherein the HTML page includes display information for the HTML page.

6. The computer program product of claim 1, wherein the navigation stack includes a marker that indicates a top of the stack, and wherein pushing the cloned and renamed template section on to the navigation stack includes adding the cloned and renamed template section immediately after the marker.

7. The computer program product of claim 1, wherein the computer program product is operable such that prior to receiving the first request for the content, previous content is displayed to the user from the navigation stack.

8. The computer program product of claim 7, wherein the computer program product is operable such that after the content from the navigation stack is displayed in response to the first request from the user, a second request is received from the user for the previous content to be displayed.

9. The computer program product of claim 8, wherein the second request includes the selection of a "back" icon on an internet browser.

10. The computer program product of claim 8, wherein the computer program product is operable such that in response to the second request, the content added to the navigation stack in response to the first request is removed from the navigation stack.

11. The computer program product of claim 10, wherein the computer program product is operable such that the previous content from the navigation stack is displayed.

12. The computer program product of claim 8, wherein the computer program product is operable such that a marker notes where the content was added to the navigation stack in response to the first request, and such content is removed utilizing the marker.

13. The computer program product of claim 1, wherein the cloned and renamed template section of the navigation stack is given an identifier that reflects a record type and time of creation of the cloned and renamed template section of the navigation stack.

14. A method, comprising:
receiving a first request from a user for content to be displayed;

retrieving the content from a database, where the content is stored in a first format;

translating the retrieved content from the first format to a second format;

cloning a template section of a hypertext markup language (HTML) page and renaming the cloned template section to identify the requested content;

adding the retrieved and translated content to the cloned and renamed template section;

pushing the cloned and renamed template section onto a navigation stack of the HTML page; and displaying the content from the navigation stack of the HTML page.

15. An apparatus, comprising:
a processor and a hardware memory in communication with the processor, the memory comprising computer readable program code that when executed by the processor, causes the processor to perform operations comprising:

receiving a first request from a user for content to be displayed;

retrieving the content from a database, where the content is stored in a first format;

translating the retrieved content from the first format to a second format;

cloning a template section of a hypertext markup language (HTML) page and renaming the cloned template section to identify the requested content;

adding the retrieved and translated content to the cloned and renamed template section;

pushing the cloned and renamed template section onto a navigation stack of the HTML page; and displaying the content from the navigation stack of the HTML page.

* * * * *